(12) United States Patent
Hattersley, Jr. et al.

(10) Patent No.: US 7,856,911 B2
(45) Date of Patent: Dec. 28, 2010

(54) AUTOMATED SCRAP WIRE REMOVAL METHOD AND APPARATUS

(75) Inventors: Harold James Hattersley, Jr., Brick, NJ (US); Richard E. Jakubowski, New Castle, DE (US)

(73) Assignee: Niehoff Endex North America, Inc., Swedesboro, NJ (US)

( * ) Notice: Subject to any disclaimer, the term of this patent is extended or adjusted under 35 U.S.C. 154(b) by 1178 days.

(21) Appl. No.: 10/973,225

(22) Filed: Oct. 25, 2004

(65) Prior Publication Data

US 2005/0132853 A1 Jun. 23, 2005

Related U.S. Application Data

(60) Provisional application No. 60/516,066, filed on Oct. 30, 2003.

(51) Int. Cl.
*B26D 7/06* (2006.01)
*B26D 7/00* (2006.01)

(52) U.S. Cl. ................ 83/130; 83/86; 83/950; 83/157; 83/160; 83/167

(58) Field of Classification Search .......... 83/78, 83/84, 86, 90, 162, 165, 167, 907, 950, 157–160
See application file for complete search history.

(56) References Cited

U.S. PATENT DOCUMENTS

| | | | | |
|---|---|---|---|---|
| 2,823,747 A | * | 2/1958 | Rehberg | 83/102 |
| 3,618,871 A | * | 11/1971 | Gilvar | 242/363 |
| 3,759,125 A | * | 9/1973 | Vortkamp | 83/90 |
| 3,918,330 A | * | 11/1975 | Blaha | 81/9.51 |
| 4,266,455 A | * | 5/1981 | Ago | 83/84 |
| 4,777,711 A | * | 10/1988 | Forkner et al. | 29/566.3 |
| 5,357,072 A | * | 10/1994 | Garwick | 219/69.12 |
| 5,797,299 A | * | 8/1998 | Long, Jr. | 81/9.51 |

* cited by examiner

*Primary Examiner*—Ghassem Alie
*Assistant Examiner*—Bharat C Patel
(74) *Attorney, Agent, or Firm*—Montgomery, McCracken, Walker & Rhoads, LLP; Evelyn H. McConathy

(57) ABSTRACT

A module for automatic scrap wire isolating and removal is used in systems such as wire insulation lines for extricating scrap wires while minimally interfering with the mechanized wire insulation process. One such module includes a knife assembly with a knife, a scrap tray with a tilt plate for catching the scrap wire below the knife assembly, an accumulator with curved hooks oriented for catching and accumulating, one at a time, the wire and the scrap wire and rotatable for letting go, one at a time, of the wire and scrap wire, so as to allow the knife to completely separate the scrap wire from the wire. A lifting linkage in this module is operatively engaged with the tilt plate tilting it at an angle sufficient for the isolated scrap wire to slide off, whereby the scrap wire is removed.

10 Claims, 25 Drawing Sheets

| ITEM | QTY. | DESCRIPTION |
|---|---|---|
| 200 — 1 | 1 | ACCUMULATOR PLATE |
| 146 — 2 | 8 | PALLET |
| 204 — 3 | 7 | LINK/BUSHING ASSEMBLY |
| 4 | 14 | #TT-710-1 "ISOSTATIC" THRUST WASHER |
| 5 | 1 | CYL. CONNECTING BLOCK, UPPER |
| 6 | | |
| 224 — | 16 | #7C8E24062 "STOCK DRIVE" ARBOR SHIMS (.062x3/4I.D.x1-1/8O.D.) |
| 212 — B | 8 | H.H.C.S. 3/4-10 UNC x 4 LG. |
| 214 — | 8 | NUT 3/4-10 UNC |
| C | 1 | S.H.C.S. 3/8-16 UNC x 1 1/4 LG. |
| D | 1 | LOCK WASHER 3/8 |
| 220 — | 14 | SHOULDER BOLT 3/8 DIA. x 5/8 LG. (5/16-18 UNC THR'D) |
| 222 — | 14 | JAM NUT 5/16-18 UNC |
| G | 1 | NUT 3/8-16 UNC |
| H | 1 | S.H.C.S. 3/8-16 UNC x 1 1/2 LG. |

FIG. 3B

| BILL OF MATERIALS ||||
| SUB-ASSY | ITEM | QTY. | DESCRIPTION |
| --- | --- | --- | --- |
| 300 | | 1 | TILT PLATE |
| 302 | | 1 | RECIPROCATING PLATE |
| 308 | | 1 | SCRAP CATCHER |
| 310 | 4 | 1 | SUPPORT ANGLE, RECIPROCATING PLATE |
| | * | 1 | 'LIFT' LINKAGE ASSEMBLY |
| | 6 | 1 | SUPPORT ANGLE, RECIPROCATING PLATE |
| | 7 | 1 | SUPPORT ANGLE, RECIPROCATING PLATE CYLINDER |
| 304 | | 1 | 'THOMSON' SUPPORT RAIL ASSEMBLY, LEFT |
| 306 | | 1 | 'THOMSON' SUPPORT RAIL ASSEMBLY, RIGHT |
| | * 10 | REF. | JACK SHAFT ASSEMBLY |
| | 11 | 1 | CYLINDER, RECIPROCATING PLATE |
| 330 | | 1 | WIRE SNAGGER/SQUEEZER PLATE |
| | 13 | 1 | WIRE SNAGGER/SQUEEZER ANVIL PLATE |
| | 14 | 1 | CYLINDER, WIRE SNAGGER/SQUEEZER PLATE |
| | 15 | 1 | MOUNTING PLATE, WIRE SNAGGER/SQUEEZER CYL. |
| | 16 | 1 | ANGLE BRACKET, RECIPROCATING PLATE |
| | 17 | 2 | CENTERING CLIP, TILT PLATE |
| | 18 | 1 | BRACKET, WIRE SNAGGER/SQUEEZER CYLINDER |
| | 19 | 1 | CHUTE, SCRAP WIRE |
| | 20 | 4 | SPACER, TILT PLATE |
| 320 | | 2 | PLATE, STOP |
| 312 | | 1 | LIFTING PIN BRACKET |
| | 23 | 12 | 'THOMSON' PRECISION STEEL BALL BUSHING PILLOW BLOCK |
| | 24 | 6 | 'BOSTON' 1-PIECE STEEL CLAMP COLLAR CAT. N). CSC100, ITEM 49014 |
| | 25 | 2 | 'McMASTER' COMPRESSION SPRING No. 9657K142 |
| | 26 | 4 | 'McMASTER' CYL. SPEED REG. No. 6692K11 |
| | 27 | 1 | GUARD, WIRE SQUEEZER/SNAGGER |
| | A | 8 | S.H.C.S.: #10-24 UNC x 1/2 LONG |
| | B | 48 | S.H.C.S.: #10-24 UNC x 3/4 LONG |
| | C | 36 | S.H.C.S.: #10-24 UNC x 1" LONG |
| | D | 2 | S.H.C.S.: #10-24 UNC x 1 1/4 LONG |

FIG. 4B
(Part 1)

| | | | |
|---|---|---|---|
| | E | 18 | S.H.C.S.: 1/4-20 UNC x 1/2 LONG |
| | F | 14 | S.H.C.S.: 1/4-20 UNC x 1" LONG |
| | G | 4 | S.H.C.S.: 1/4-20 UNC x 3/4 LONG |
| | H | 4 | S.H.C.S.: 5/16-18 UNC x 2 1/2 LONG |
| | J | 42 | S.H.C.S.: 3/8-16 UNC x 1 1/4 LONG |
| | K | 4 | S.H.C.S.: 3/8-16 UNC x 1 1/2 LONG |
| | L | 2 | S.H.C.S.: 3/8-16 UNC x 3/4 LONG |
| | M | 36 | REGULAR HEX. NUT: #10-24 UNC |
| | N | 4 | REGULAR HEX. NUT: 5/16-18 UNC |
| | P | 2 | REGULAR HEX. NUT: 3/8-16 UNC |
| | R | 86 | PLAIN FLAT WASHER FOR #10 SCREW |
| | S | 30 | PLAIN FLAT WASHER FOR 1/4 SCREW |
| | T | 4 | PLAIN FLAT WASHER FOR 5/16 SCREW |
| | U | 46 | PLAIN FLAT WASHER FOR 3/8 SCREW |
| | V | 36 | SPLIT LOCKWASHER FOR #10 SCREW |
| | W | 4 | SPLIT LOCKWASHER FOR 5/16 SCREW |
| | X | 40 | SPLIT LOCKWASHER FOR 3/8 SCREW |

FIG. 4B
(Part 2)

| ITEM | QTY. | DESCRIPTION |
|---|---|---|
| 1 | 4 | SPACER, DRIVE BEARING |
| 2 | 2 | SPACER, KNIFE |
| 3 | 2 | SPACER BLOCK, KNIFE MTG. |
| 4 | 2 | PLATE, BELT CLAMP |
| | 1 | KNIFE, BLOCK |
| 6 | 4 | SPACER, TAKE UP, IDLER |
| 7 | 2 | SHAFT, TAKE UP |
| 8 | 4 | MTG. BLOCK, SHOCK |
| 9 | 2 | PLATE, BELT & KNIFE MTG. |
| 10 | 1 | STIFFENER, MAIN PLATE, TAKE UP |
| 11 | 1 | STIFFENER, MAIN PLATE, DRIVE |
| 12 | 2 | GUARD, SIDE |
| 13 | 2 | GUARD, EXTENSION |
| | 1 | KNIFE, RING |
| | 1 | PLATE, MAIN |
| 16 | 1 | SHAFT, DRIVE |
| 17 | 4 | "SEALMASTER" TAPPED BASE PILLOW BLOCK |
| 18 | 2 | "SEALMASTER" TAPPED BASE PILLOW BLOCK |
| 19 | 4 | "ACE" SHOCK ABSORBER (3/4-16 UNF BODY) |
| 20 | 5 | "GATES" POLY CHAIN GT2 SPROCKET (3.409 P.D.) |
| 21 | 2 | "GATES" TAPER-LOCK BUSHING (1" BORE W/KEY WAY) |
| 22 | 3 | "GATES" TAPER-LOCK BUSHING (1 1/4" BORE W/K'WAY) |
| 23 | 2 | "GATES" GT2 POLY BELT |
| 24 | 1 | "GATES" GT2 POLY BELT |
| 25 | 1 | "McMASTER-CARR" .001 SLOTTED SHIM (PKG. OF 20) |
| 26 | 1 | "McMASTER-CARR" .005 SLOTTED SHIM (PKG OF 20) |
| | 2 | "THK" LM LINEAR MOTION SYSTEM |
| 28 | 4 | SPACER, MAIN PLATE |
| | 1 | SPACER, PULLEY/CLUTCH |
| | 1 | PULLEY REWORK, CLUTCH |

FIG. 5B
(Part 1)

| | 31 | 1 | SUPPORT CLIP, PROX., L.H. |
|---|---|---|---|
| | 32 | 1 | SUPPORT CLIP, PROX., R.H. |
| 516 | | 1 | 'NEXEN' PILOT MOUNTED CLUTCH |
| 518 | | 1 | 'BALDOR' MOTOR, 2HP; TEFC; 145TC FRAME; 1725 RPM |
| | 35 | 1 | SUPPORT BRACKET, GEARBOX |
| | 36 | 1 | 'BOSTON' GEAR REDUCER, 20:1 RATIO |
| | 37 | 4 | STANDOFF, LOWER OUTER CONTAINMENT WELDMENT |
| 508 | | 2 | PROXIMITY SWITCH |
| | 39 | 2 | PROXIMITY SWITCH CABLE |
| | 40 | 1 | STRAP FOR CLUTCH |
| | 41 | 1 | GUARD, CLUTCH |
| SUB ASSY | 42 | 1 | JACK SHAFT ASSEMBLY |
| | A | 10 | #10-32 UNF x 7/8 LG. S.H.C.S. |
| | B | | |
| | C | 32 | #10 LOCK WASHER |
| | D | 8 | 1/4-20 UNC x 3/4 LG. S.F.H.S. |
| | E | 8 | 1/4-20 UNC x 1 3/4 LG. S.H.C.S. |
| | F | 10 | 3/8-16 UNC x 3/4 LG. S.H.C.S. |
| | G | 12 | 3/8-16 UNC x 1 1/2 LG. S.H.C.S. |
| | H | 4 | 3/8-16 UNC x 1 3/4 LG. B.H.S.C.S. |
| | I | 4 | 3/8-16 UNC x 2 LONG S.H.C.S. |
| | J | 2 | 1/2-13 UNC x 2 1/2 LG. S.H.C.S. |
| | K | 6 | 1/2 LOCK WASHER |
| | L | 8 | M8 x 1.25 x 70mm LG. S.H.C.S. |
| | M | 16 | 3/8 LOCK WASHER |
| | N | 18 | M6 x 1 x 25mm LG. S.H.C.S. |
| | O | 6 | PLAIN FLAT WASHER FOR #10 SCREW |
| | P | 4 | 3/8-16 UNC x 3 LG. S.H.C.S. |
| | Q | 8 | PLAIN FLAT WASHER FOR 3/8 SCREW |
| | R | 8 | PLAIN HEXAGON NUT: 3/8-16 UNC |

492

FIG. 5B
(Part 2)

492

| | | |
|---|---|---|
| S | 4 | 1/4-20 UNC x 1 1/2 LONG S.H.C.S. |
| T | 4 | 1/4-20 UNC x 2 LONG S.H.C.S. |
| U | 4 | 1/2-13 UNC x 1 1/2 LONG S.H.C.S. |
| V | 2 | 3/8-16 UNC x 1" LONG SOC. HD. SETSCREW, FLAT POINT |
| W | 1 | 5/16 x 1/2 LONG SOCKET SHOULDER SCREW |
| X | 2 | 1/4-20 UNC x 3/4 LONG S.H.C.S. |
| Y | 6 | #10-32 UNF x 5/8 LONG S.H.C.S. |
| Z | 10 | #10-32 UNF x 3/8 LONG B.H.S.C.S. |

GREEN LOCK-TITE ALL THREADS AT FINAL ASSEMBLY.

KNIFE ADJUSTMENT PROCEDURE:
 ✱
1) MOUNT KNIFE BLOCK (ITEM 5).
2) INSERT SHIMS (ITEMS 24 & 25)
   TO ACHIEVE .001"-.002" CLEARANCE
   BETWEEN KNIFE BLOCK (ITEM 5)
   AND RING KNIFE (ITEM 14).
3) NOTE: APPROX. SHIM HEIGHT = .015"

FIG. 5B
(Part 3)

ROTATED 90° COUNTER CLOCKWISE

ROTATED 90° COUNTER CLOCKWISE

AUTOMATED SCRAP WIRE REMOVAL METHOD AND APPARATUS

REFERENCE TO EARLIER APPLICATION

This application claims benefit from and incorporates by reference U.S. Provisional Application Ser. No. 60/516,066, filed Oct. 30, 2003, titled "Automated Scrap Wire Removal Method and Apparatus."

BACKGROUND

It is a common practice, in the automotive electric parts field and in the networking infrastructure field, to optimize cable quality by tandem wire drawing and extrusion. For example, local area network (LAN) cables are drawn to size and extruded in tandem with insulation. Then, in the automotive parts field, it is also common to package insulated wire in cardboard barrels or drums for subsequent payout into automotive wire harness assembly equipment.

The amount of wire that can be packaged in the barrel depends on the outside diameter of the wire and the dimensions of the barrel. Typical amounts range from a minimum length of 30,000 ft to a maximum of 120,000 ft. Since a common harness length is anywhere from 3 ft to 20 ft, many harnesses can be made from a single barrel of wire.

Typically, wire insulation material such a plastic is extruded to form the outer layer of the insulated wire. During this process, application of the insulation material to the surface of the wire can fail and defects in the insulation can occur. With such defects, an improperly insulated wire is likely to fail diameter, spark, and other tests for defects. Hence, it is important to isolate these defects by, among other things, removing the damaged sections of the insulated wire. It is most advantageous to remove these damaged wire sections prior to feeding the insulated wire into the harness assembly equipment.

The present practice of removing the defective insulated wire sections involves intervention by the machine operator. Human intervention in the fast speed, mechanized wire insulation process for the purpose of removing defective sections is difficult and not completely effective. Clearly, manual operation cannot address all the various situations that may occur during routine operation of the insulating and coiling process. One such difficult situation is the occurrence of multiple faults in quick succession.

In view of the foregoing, automation of the removal process promises to be a more effective approach to extricating the defective wire sections. Accordingly, there is a need to more fully automate the wire insulation process, particularly as it relates to the scrap wire removal process.

SUMMARY OF THE INVENTION

The present invention addresses these and related needs. In particular, the present invention offers a new approach to scrap wire removal. In essence, the new approach provides automatic scrap wire removal method and system.

Various aspects of the present invention contribute to the automation of the removal process and its improved results. Among others, these include: a knife assembly operative as a bi-directional wire cutting means; a scrap tray operative to snag the defective wire and extricate it from the insulating line; a scrap tray lifting mechanism operative to lift the scrap tray for dumping the scrap wire into a scrap container; and a wire accumulator with a pallet and curved hooks operative to collect the wire without a defect (good wire) as it accumulates on the pallet while the scrap wire is being extricated.

In one implementation, a module for automatic scrap wire isolation and removal that includes a knife assembly with a knife and a scrap tray with plates for catching the scrap wire below the knife assembly. The tray is configured with a tilt plate. This module also includes an accumulator with hook-shaped arms (pallets) that are curved for lassoing and accumulating the scrap wire and keeping it from falling off the accumulator until it is cut by the knife from the wire below. The curved hooks are rotatable momentarily in one direction for letting go of the scrap wire. The curved hooks are rotatable also in the other direction for lassoing and accumulating the good wire above the scrap wire until the scrap wire engages the knife and is isolated from the good wire above. The module further includes a lifting linkage operatively engaged with the tilt plate, the lifting linkage being extendable to tilt the tilting plate at an angle sufficient for the isolated scrap wire to slide off the tilt plate, whereby the scrap wire is removed.

Another aspect of the invention is the method contemplated for implementing the scrap wire isolation and removal. In this method, after guiding a wire to an accumulator via a tester, the accumulator is commanded to close when the tester indicates a defect in the wire. Upon closing, the accumulator snags the scrap wire so that it hangs from the accumulator and starts accumulating more of the scrap wire above that includes the defect. A command is issued to the reciprocating scrap tray to move to an active position and snag the wire hanging from the accumulator. While the accumulator is closed, a reciprocating knife is commanded to move in one direction and cut below the defect the scrap wire hanging from the accumulator to separate it from the good wire below. After the good wire is separated from the scrap wire above, it is free to fall but its end is urged to fall outside a container for collecting the good wire. This makes it possible to grasp the end of the falling wire and secure it to an outside surface of the container, whereby the end of the good wire is easily located.

Next, the accumulator is commanded to open momentarily and release the accumulated scrap wire. The accumulator is open for a sufficient time to allow the entire scrap wire to fall below the reciprocating knife. When the accumulator closes again it snags the good wire above the scrap wire from the good wire above so that the scrap wire hangs down from the accumulator. While the accumulator is again closed, the reciprocating knife is commanded to move in an opposite direction and cut the scrap wire above the defect, thereby isolating the scrap wire and allowing it to fall onto the reciprocating scrap tray. Finally, the reciprocating scrap tray is commanded to move to a resting position, away from the coiling area, and tilt to dispose of the scrap wire.

As can be appreciated, this approach has the advantage of more effectively extricating scrap wires while minimally interfering, if at all, with the mechanized wire insulation process. This and other features, aspects and advantages of the present invention will become better understood from the description herein and accompanying drawings.

BRIEF DESCRIPTION OF THE DRAWINGS

The accompanying drawings which, are incorporated in and constitute a part of this specification illustrate various aspects of the invention and together with the description, serve to explain its principles. The drawings include FIGS. 1, 2 and three sets of diagrams, namely, the set of FIGS. 3A-3D, the set of FIGS. 4A-4J and the set of FIGS. 5A-5H.

Typically, an item shown in different diagrams will have the same call out number in all the diagrams in which it is shown, and this applies to the drawings here. However, because the three sets of diagrams, FIGS. 3A-3D, 4A-4J and 5A-5H, respectively, represent engineering drawings of an actual embodiment, the call-out numbering scheme in these drawings follows an engineering convention different than that in FIGS. 1 and 2. Specifically, each set of the diagrams is treated individually with its own alpha numeric item-referencing sequence where in each set the items are numbered sequentially 1, 2, 3, . . . and A-Z. For example, a particular item # (e.g., '1') references the same item (item 1) in all the diagrams within one set, but in different sets the particular item # references different items. Items referenced by letters include fastening means such as bolts, nuts, washers and screws. Moreover, in order to avoid duplication of an item in the parts list of the system (overall bill of materials), once a first instance of an item is called out, subsequent instances of that item, at other diagrams in the set, are referenced with the same call-out number along with a 'REF' indication. This indication clarifies that the item has been references originally at another diagram in the set.

Figure 1:
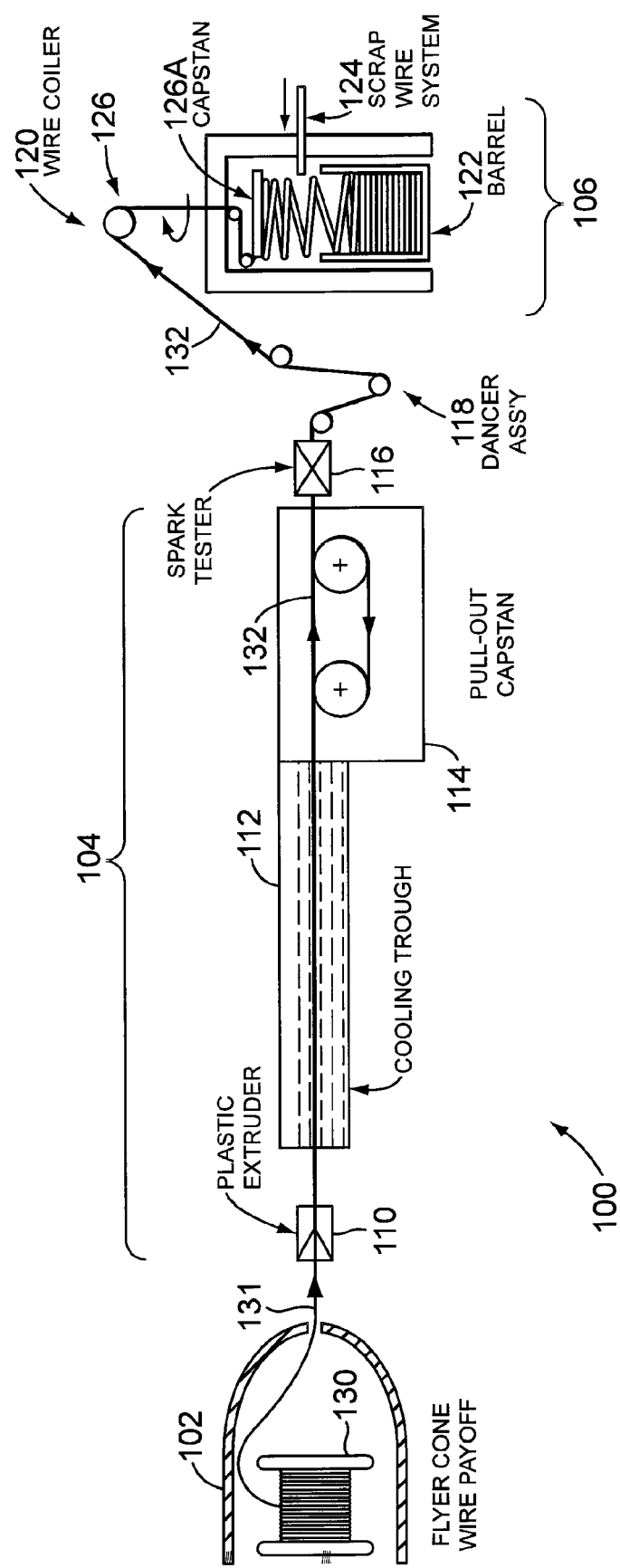
Figure 2:
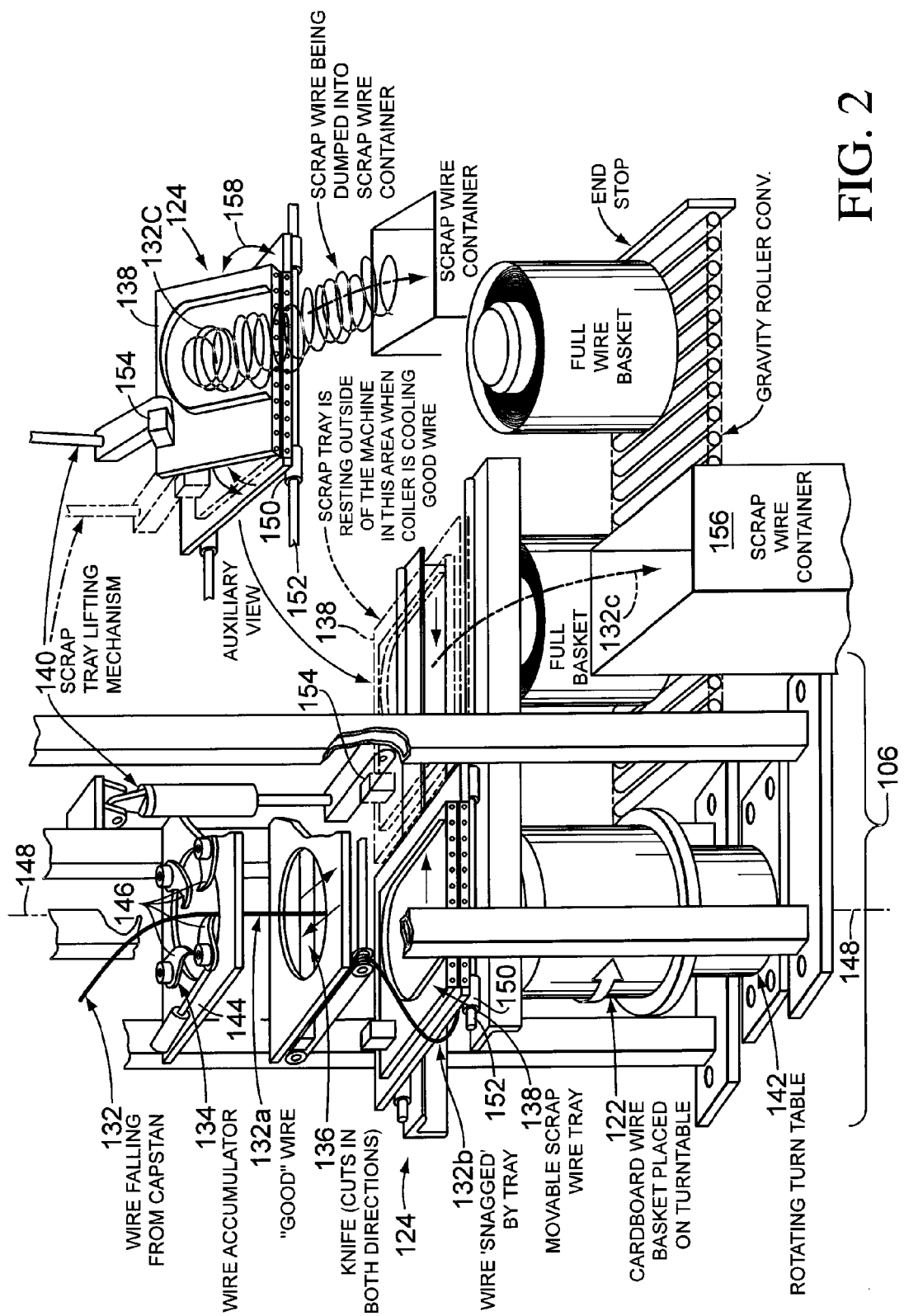

The drawings are briefly described as follows:

FIG. 1 illustrate a wire insulation system;

FIG. 2 illustrates in some detail the automatic scrap wire removal module of the wire insulation system;

FIGS. 3A-3D is a set of diagrams of an accumulator with the hook arms (pallets) in the open and closed positions, respectively;

FIGS. 4A-D is a set of diagrams of a scrap tray and lifting mechanism from various view points; and FIGS. 5A-5H is a set of diagrams of a knife assembly from various view points.

DETAILED DESCRIPTION OF THE INVENTION

In view of the need to automate the wire insulation line more fully, the present invention provides an automated scrap wire removal system and method. In order to better understand the principles of the invention, the system and method are described using the illustration of a wire insulation line. FIG. 1 is a diagram of the wire insulation line (the so called "wire insulation system").

In general, a typical wire insulating line consists of a bare wire payoff device 102, the insulation equipment 104, and a coiler 120. As shown in more detail in FIG. 1, a wire insulation system preferably includes: a bare wire payoff mechanism 102, an extruder 110, a cooling means 112, a pull-out capstan 114, a spark tester 116, a dancer 118, a wire scrap removal module 124, and an insulated wire take-up mechanism also referred to here as the coiler 120. In addition, there are one or more wire reels (e.g., 130), wire baskets or barrels 122, and scrap wire containers (not shown). The scrap wire module will be described in more detail below.

The wire payoff mechanism 102 is constructed for paying off wire from a reel (or spool) 130, preferably in a controlled manner. For example, after the reel is placed into a payoff position, a wire tensioner is engaged to maintain wire tension and ensure continuous payoff. Optionally, one or more guide bars are engaged with the wire so as to keep it from jumping off the rollers as it is moved through toward the extruder.

On the way out from the extruder, the insulated wire is cooled in a cooling areal 12 and tensioned in the pull-out capstan (or simply capstan) 114. The axis of the capstan 114 is preferably in a horizontal plane.

In this system configuration, the spark tester 116 is positioned, after the capstan 114, to receive the insulated wire output from the extruder 110. Alternatively, the spark tester is integrated with the extrusion and rewind lines for detecting defects in the wire insulation. The spark tester 116 checks for faults in wire insulation and detects bare patches and pin-holes. To that end, the spark tester includes high-voltage and ground electrodes. In particular, when the wire passes by the spark tester's high-voltage electrode, if the wire insulation is defective it allows a spark to jump to the ground electrode via the cable core. This type of phenomena results in increased current which when detected is indicative of the insulation defect. The insulation defect indication can be registered and presented down stream to other parts of the system and to the operator. The defective wire is then isolated from the good wire and discarded as a scrap wire, and the good wire is introduced to the coiler 120. In the system of FIG. 1 the coiler 120 and scrap wire removal module 124 are shown as separate components, making the scrap wire removal system 124 an option for the purchaser of a coiler 120.

The coiler 120 is a mechanism for packaging the wires into barrels 122. While the payoff 102 feeds the bare wire 131 to the insulating line equipment, the coiler 120 "takes-up" the insulated wire 132 in barrels 122. In the coiling process, the insulated wire 132 is continuously presented to the coiler at process speeds. This speed can, in one instance, range from 1,000 feet per minute to 4,000 feet per minute.

At the coiler 120, a rotating flyer assembly wraps the wire around a stationary capstan 126 while the dancer 118 provides the static or variable tension in the wire 132 as it is presented to the coiler. The convolutions (loops) of insulated wire are wrapped radially along the surface of the capstan by a deflector roller that rotates together with the flyer Assembly. When the convolutions are displaced beyond the cylindrical surface of the capstan, because capstan axis is preferably in a vertical plane, they fall under by the action of gravity toward a barrel 122 located directly below the capstan 126A.

FIG. 2 is a diagram of a coiler module 106 in which the coiler scrap removal system 124 is an integral part of the module. In this configuration, the coiler is located above a barrel 122 built as a cardboard wire basket. To facilitate the circular accumulation of the insulated wire, the barrel is placed on a rotating turntable 142. The coiler is running at a high speed dropping insulated wire 132 in a helix pattern from the capstan toward the cardboard wire barrel 122. While rotating, the barrel receives the insulated wire 132a which collects circularly around the barrel's vertical axis.

In order to make a barrel change, when the barrel 122 becomes full, a device called an accumulator 134, is located between the capstan and the barrel. The accumulator is employed to intercept and collect the falling loops of wire 132a, allowing time to replace the full barrel with an empty one. The accumulator 134 is instrumental in also allowing the automatic scrap wire removal. Importantly, the accumulator works in tandem with the scrap tray 138 and scrap tray lifting mechanism 140 to facilitate removal of the scrap wire 132c (more detailed diagrams of an accumulator are provided in the set of FIGS. 3A-3D).

Figure 3A:
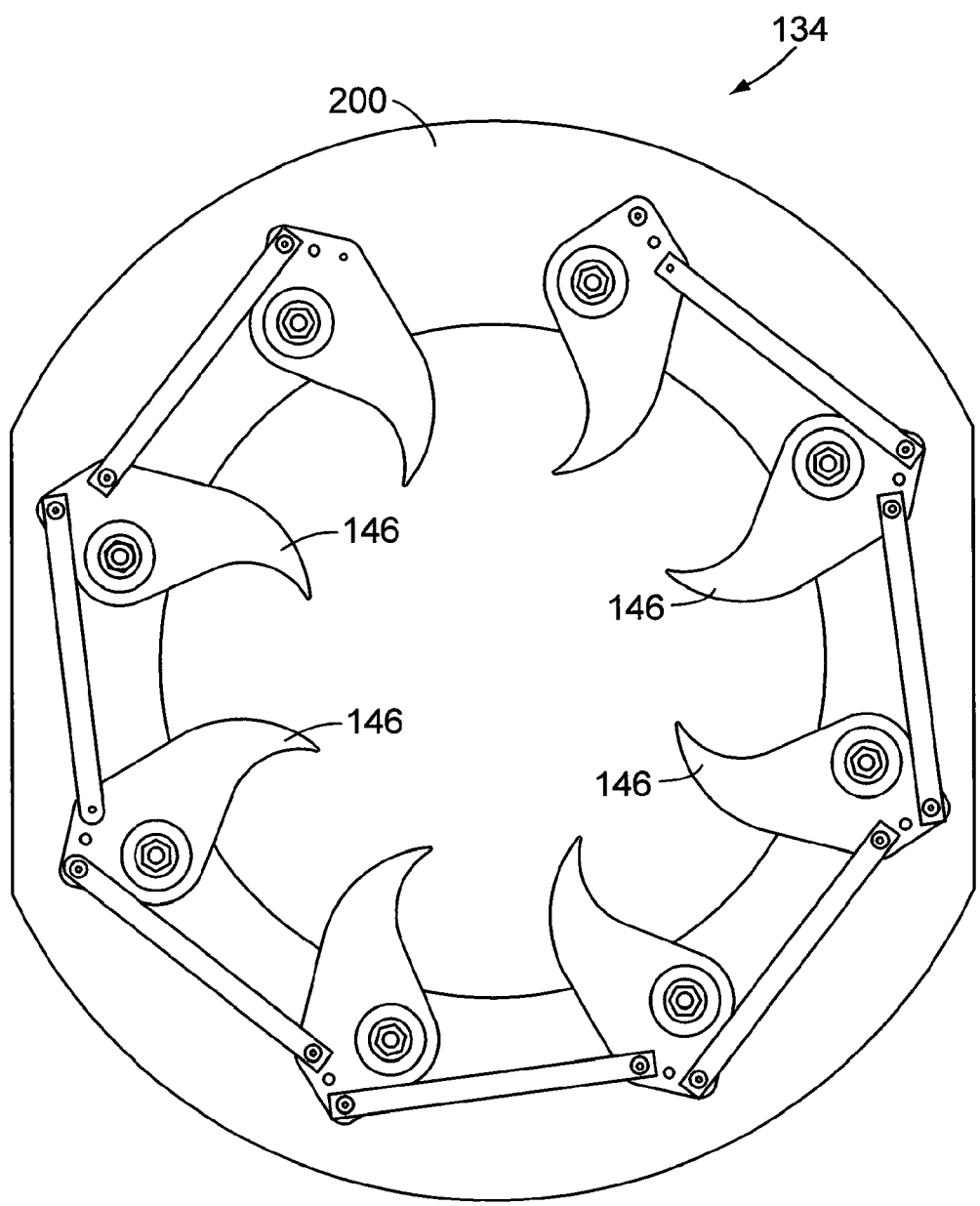

For the purpose of this discussion we assume that during operation a spark fault is detected in the wire 132 upstream of the coiler. The indication of this defect is registered and distributed downstream and to the operator. As a result, the accumulator 134 closes and starts collecting the defective wire in a lasso fashion on its pallets 146 (hook-shaped arms). Indeed, once the defect (spark fault) is detected minimal but sufficient length of the (defective) wire is collected on the pallets of the accumulator (hook-shaped arms). As shown in FIGS. 2 and 3A, the hook-shaped arms 146 capture the wire loops preventing them from falling below the accumulator.

Thus, the helical wire loops 132 that continue falling from the capstan collect at the accumulator 134. The good wire portion 132*b* that passes the accumulator just as it closes remains hanging vertically from the accumulator and extending toward the barrel below.

Additionally, in response to receiving an indication of the defective wire, the scrap wire tray 138 slides into place beneath the accumulator. As it moves, the scrap wire tray 138 aligns itself with the vertical axis 148 of the coiler, above the barrel 122 and below the accumulator 134 so as to properly engage the vertically hanging wire 132B. The scrap wire tray 138 moves on bearings 150 mounted on slide rods 152 and is shifted to this position by a pneumatic band cylinder located below it (more detailed diagrams of a scrap tray and lifting mechanism are provided in the set of FIGS. 4A-4J).

Once the scrap wire tray 138 is in position above the barrel 122, the leading edge of the tray table snags the vertically hanging wire 132*b*. Below the accumulator 134, the vertically hanging wire 132*a* passes through a knife assembly 136 (diagrams of a knife assembly are provided in the set of FIGS. 5A-5H). The knife assembly is used to cut the defective wire from the good wire by making two passes. The first pass cuts the insulated wire below the defective wire area separating it from the good wire downstream (below). The second pass cuts above the defective wire area separating it from the good wire that follows from above.

Specifically, the reciprocating knife can cut both ways with the bi-directional movement of the knife assembly. On command, the system energizes the knife assembly 136 for movement in one direction. As the knife makes the first pass in this direction it cuts the hanging wire below the defective wire area to detach the good wire 132*b* downstream (below) from the defective wire 132. The free end of the good wire drops down with gravity and it leaves behind the bad wire 132 hanging vertically from the accumulator (at or above the level of the knife). Because of the way the scrap wire tray 138 engages the good wire 132*b*, the end of the good wire falls to the outside of the barrel.

The machine operator can grab the falling end of the good wire, bend it over the top edge of the barrel and secure it to the side of the barrel (using tape or other means). All the while, the accumulator 134 collects the defective insulated wire 132 and, as a result, the insulation line upstream is not interrupted.

Preferably, the accumulator 134 reopens shortly after the wire is cut so as not to accumulate too much good wire 132*a* beyond the defect. The loops, or "donut," of accumulated defective wire drop from the accumulator onto the scrap wire tray 138. Shortly thereafter, the wire accumulator 134 closes again for capturing good wire 132*a* as it continues to drop from the capstan above.

The scrap wire segment with the entire defective area has now dropped below the knife assembly onto the scrap removal tray 138 and is cut isolating the scrap wire segment from the wire hanging from the accumulator. While the scrap wire segment is being removed, the good wire 132*a* starts accumulating on the closed pallets (hooked shaped arms) 146 of the accumulator as the good wire continues to fall from the coiler capstan.

After the knife has completed its second pass, and the accumulator 134 closes, the scrap wire tray 138 carrying the scrap wire segment is pneumatically moved to its resting position outside the coiler 106. When the scrap wire tray is at the end of its stroke (e.g., 40" stroke), a pin 154 on the scrap wire tray is automatically engaged with the scrap tray lifting mechanism 140.

As the scrap tray lifting mechanism 140 is energized, it tilts the scrap wire tray 138. The tilting angle 158 is sufficiently high to allow the scrap wire segment to slide off the scrap wire and fall with gravity into a scrap wire container 156 below.

It can be appreciated that since this process can complete in as little as 6 seconds the removal is sufficiently fast to avoid detriment to the wire insulation process upstream. The automatic scrap wire removal system just described is implemented with details such as those shown in the sets of diagrams in FIGS. 3A-3D, 4A-4J and 5A-5H.

Figure 3C:
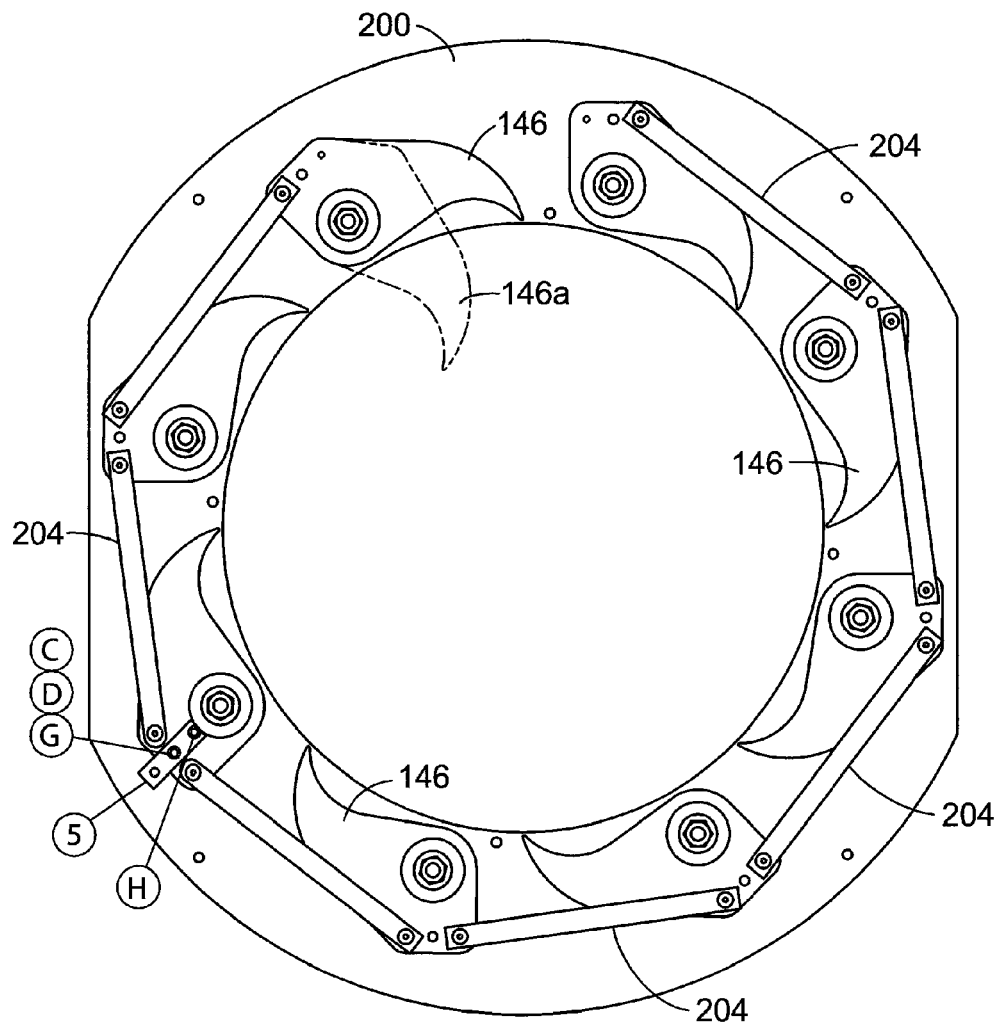
Figure 3D:
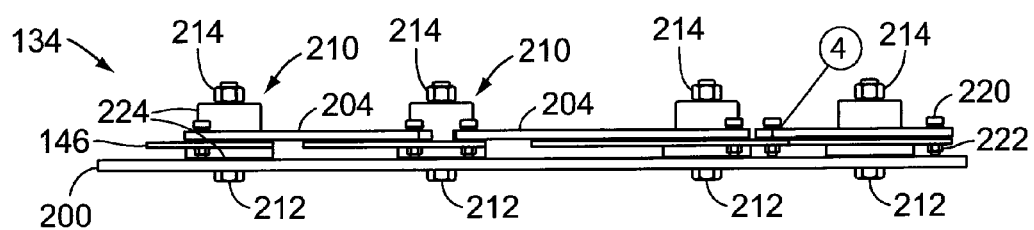

Starting with the set of diagrams that describe the accumulator 134, FIGS. 3A-3D, we note in FIGS. 3A and 3C the two pallet positions, open and closed. In FIG. 3A, the pallets 146 are shown in the closed position. In FIG. 3C, the pallets 146 are shown in the open position. Referring to FIG. 3C, the pallets 146 are rotatable between the open position (shown in solid lines) and the closed position (shown in dashed lines at 146*a*). FIG. 3B is a table containing the bill of materials for the accumulator that would normally accompany the engineering diagrams from the manufacturer. There is a correlation between the table and the engineering diagrams where the various items referenced in the diagrams are identified in the table. Based on this table, and the top view as shown in FIG. 3C, the accumulator plate 200 is designed to support the pallets 146 that collect the wire loops when the pallets are in the closed position. The linkage assemblies 204 connect the pallets along a circle on the plate 200 and their (clockwise-counterclockwise) movement switches the pallets' position back and forth between its open and closed positions. In this configuration, the linkage-pallet connection points form a smaller inside circle, e.g., 27½" dia., of the accumulator plate 200. In FIG. 3D, the side view of the accumulator 134 shows the plate 200 with four pallet connections 210 passing through and the fastening means 212, 214 to keep them in place. In this accumulator design, seven linkage assemblies 204, fastened to the pallets 146 using fasteners 220, 222 and spacers 224, connect the pallets and operate to move them as described before. Referring again to FIG. 3C, because the bars in the linkage assembly 204 are stiff, their movement follows a straight line but proximate to the aforementioned circle in the clockwise-counterclockwise direction. When the linkage assemblies 204 move clockwise, the pallets switch to the closed position (shown in dashed lines at 146*a*) and start collecting the wire on the pallets in a lasso fashion.

Figure 4A:
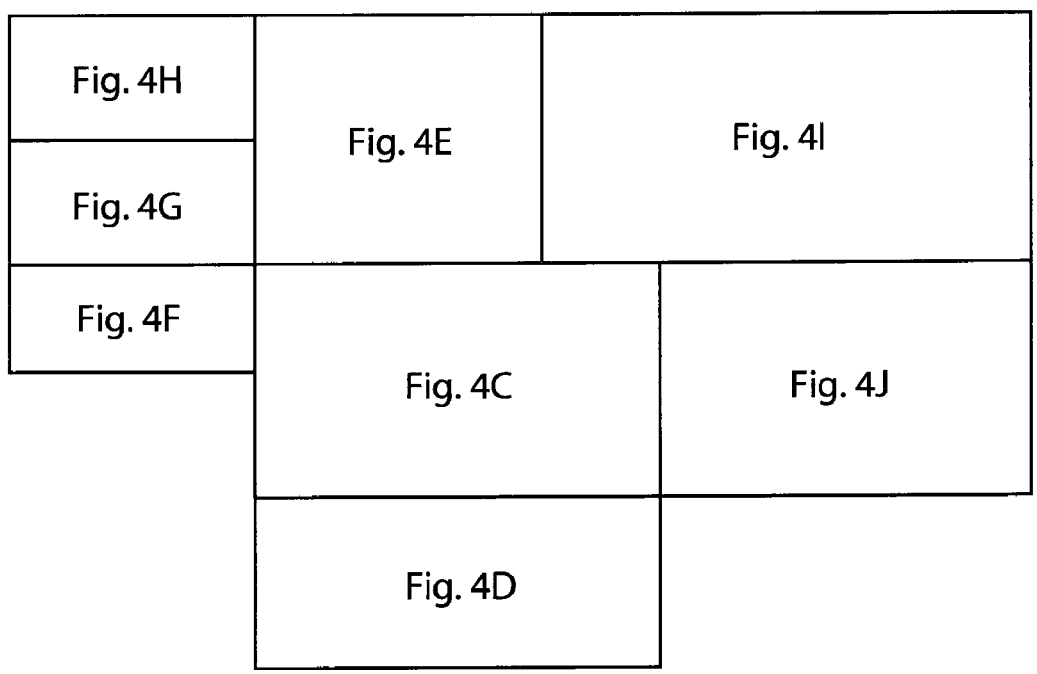

The next set of diagrams, FIGS. 4A-4J, illustrates the scrap tray 138 (FIG. 2) and lifting mechanism assembly (e.g., items 140, 150, etc. in FIG. 2). FIG. 4A is a small scale diagram of the various components that, collectively, make up a scrap tray 138 and lifting mechanism for a right handed coiler. The table in FIG. 4B is the bill of materials for the scrap tray 138 (FIG. 2) and lifting mechanism assembly 140 (FIG. 2) with reference numbers and letters that match and help identify the components in the diagrams. Various components in this assembly are shown in separate diagrams of a larger scale.

Figure 4C:
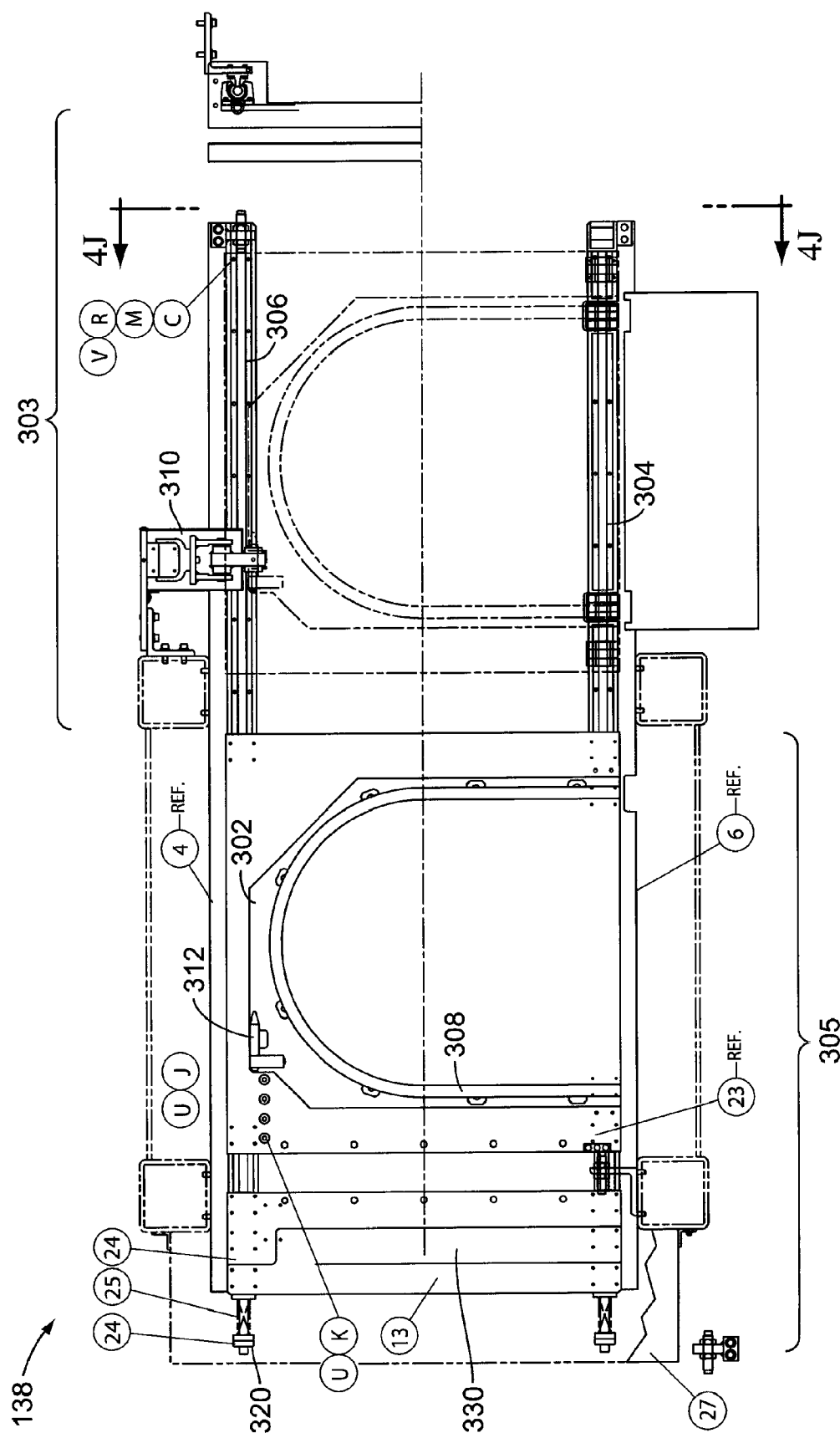

FIG. 4C shows the reciprocating plate 302 of the movable scrap tray 138 in active scrap removal position under the accumulator 134 (FIG. 2) and in resting position away from the coiling area 303. The movable scrap tray 138 is supported by a rail assembly 304, 306 on each side. A scrap catcher 308 is fitted on the tilting plate 300 (FIG. 4D) to hold the scrap wire(s) in place on the tilting plate while being transported toward the scrap wire disposal location 305 at the resting position. A lift linkage assembly 310 is activated by a lifting pin bracket 312 that engages with it when the scrap tray 138 approaches the resting position. The lifting pin bracket 312 is located at the far side of the tilting plate 300 so that it is proximate to the lift linkage 310 when the scrap tray assembly moves to its resting position and engages the lift arm of the lifting mechanism. The lift linkage 310 is activated to tilt the tilting plate 300 (FIG. 4D) at an angle that allows the scrap wire to slide down with gravity into the scrap wire container (item 156 in FIG. 2).

Figure 4D:
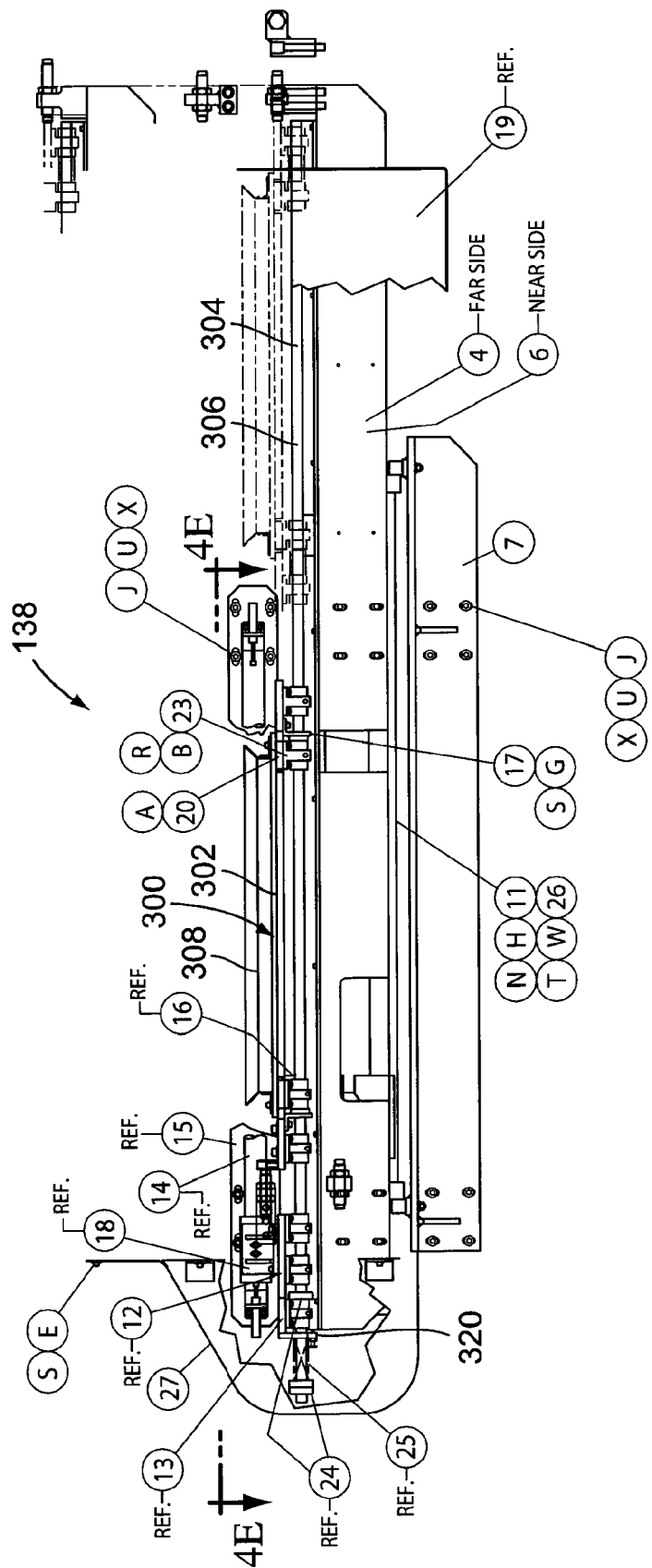
Figure 4E:
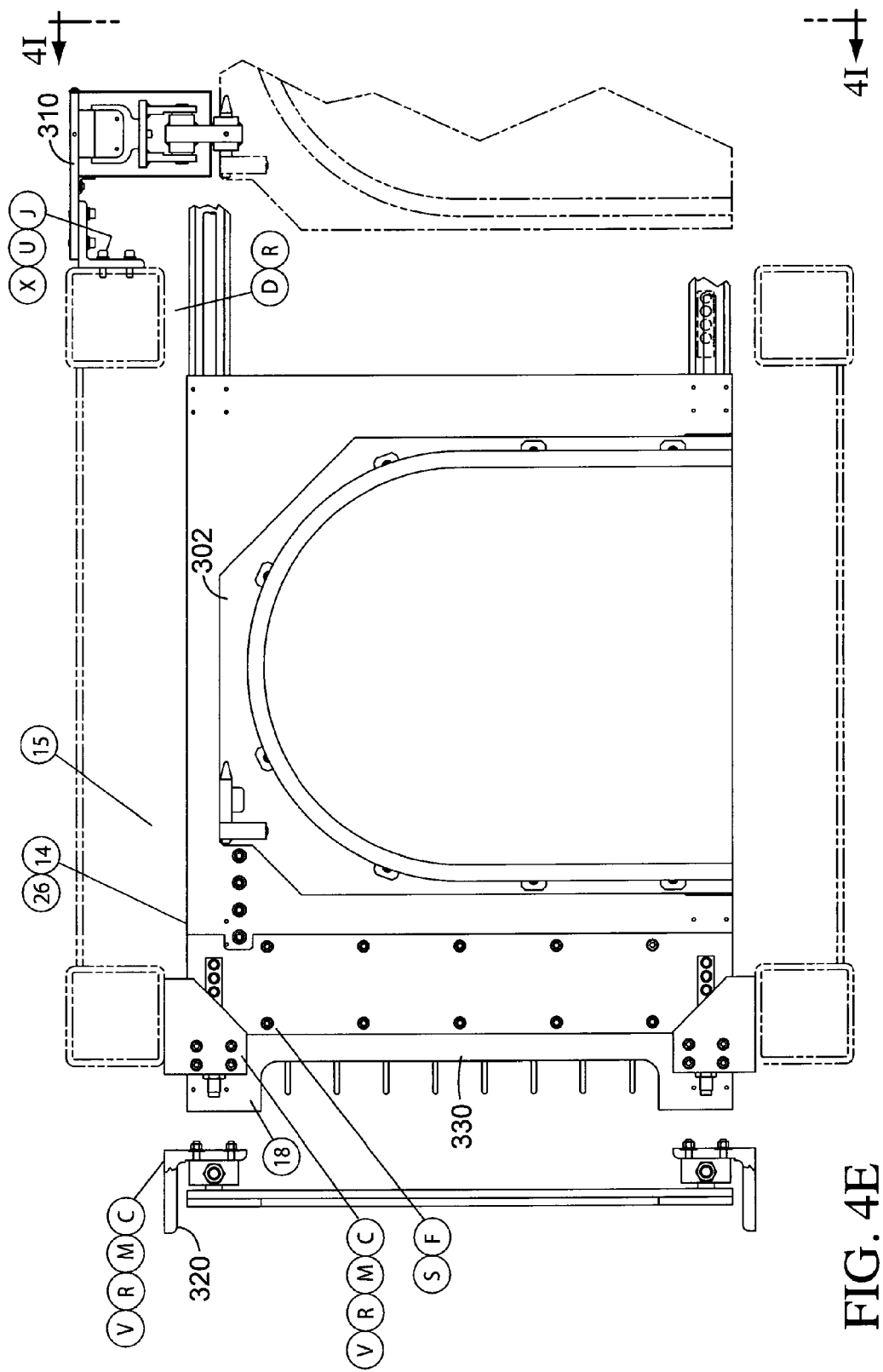
Figure 4F:
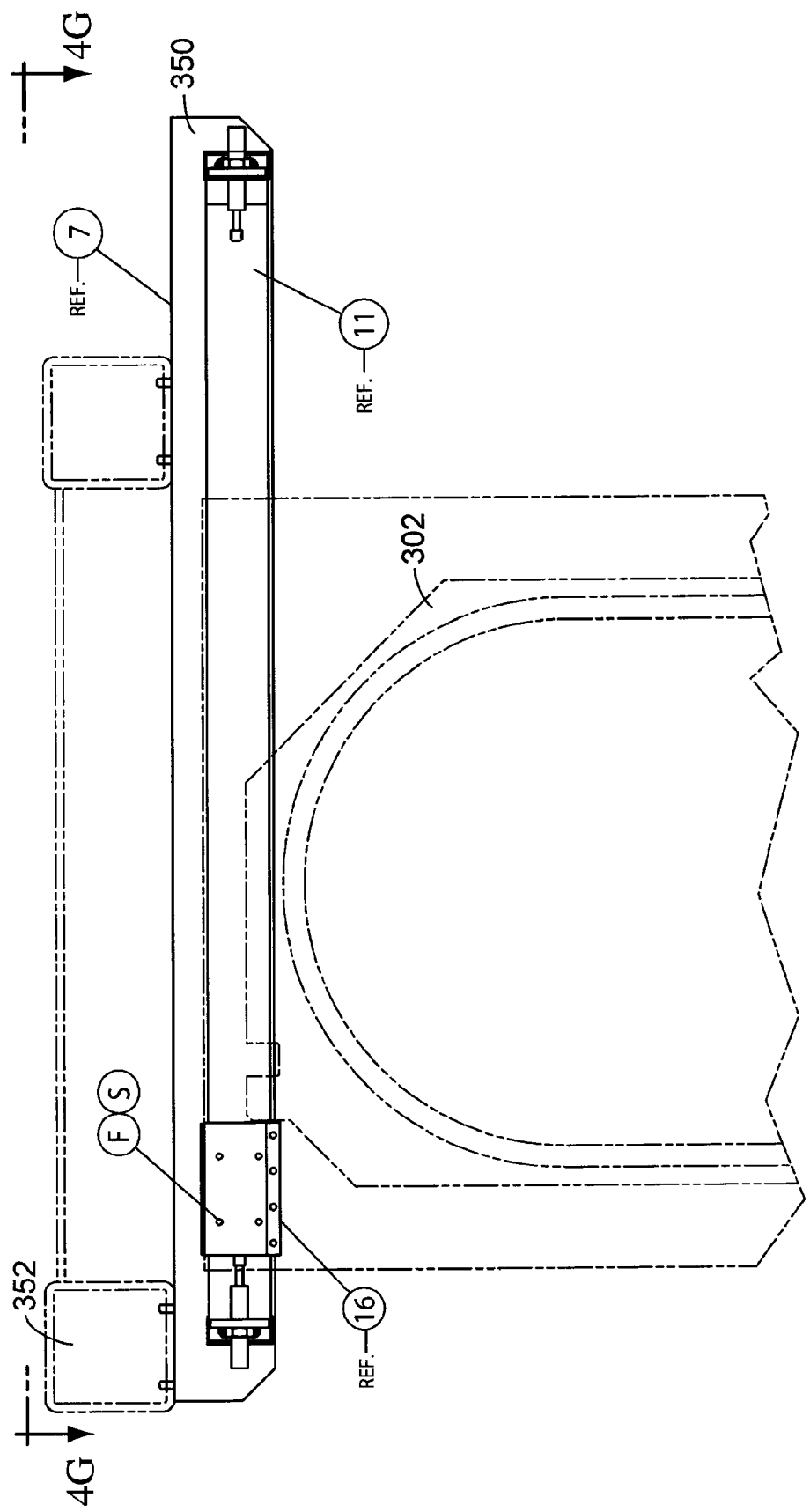
Figure 4G:
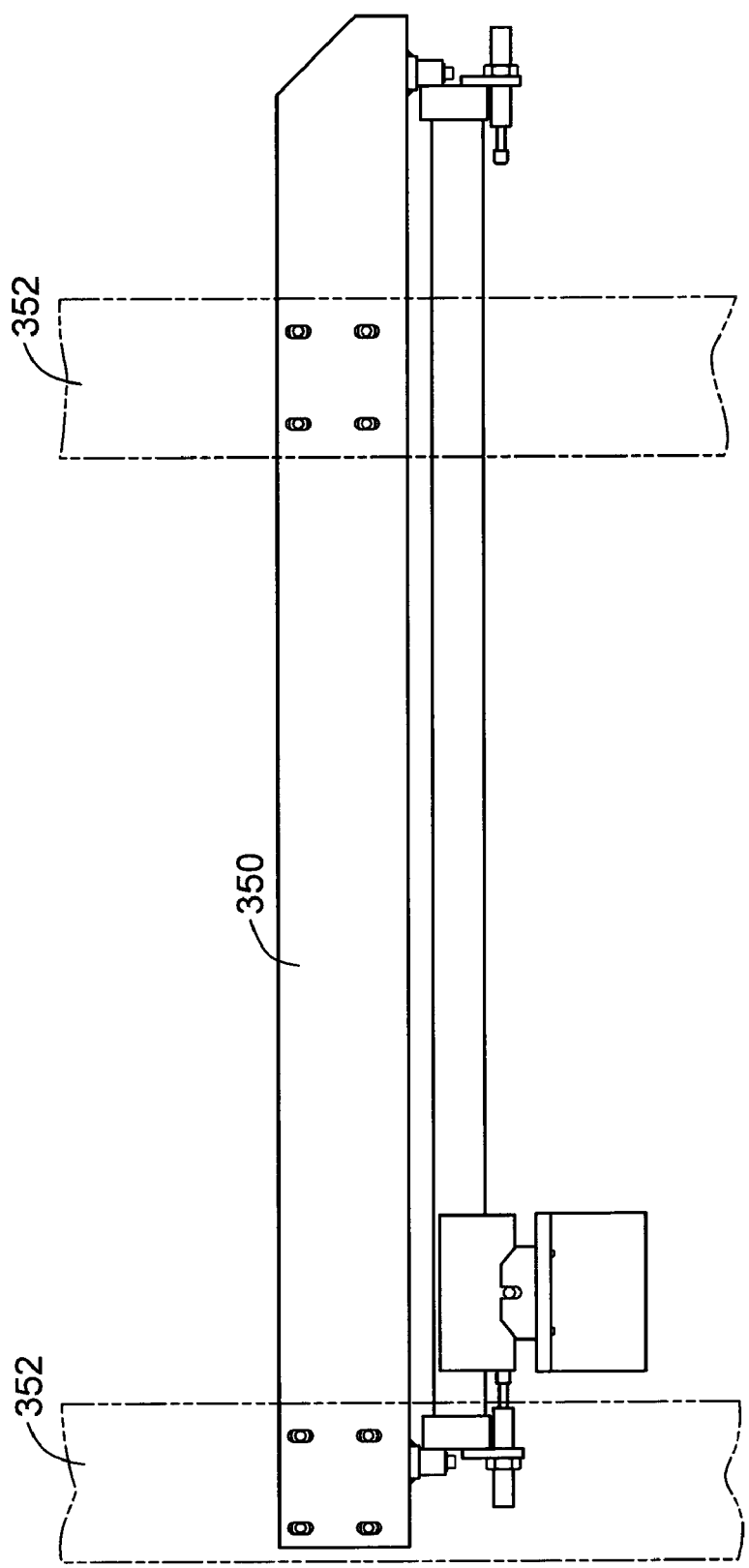
Figure 4H:
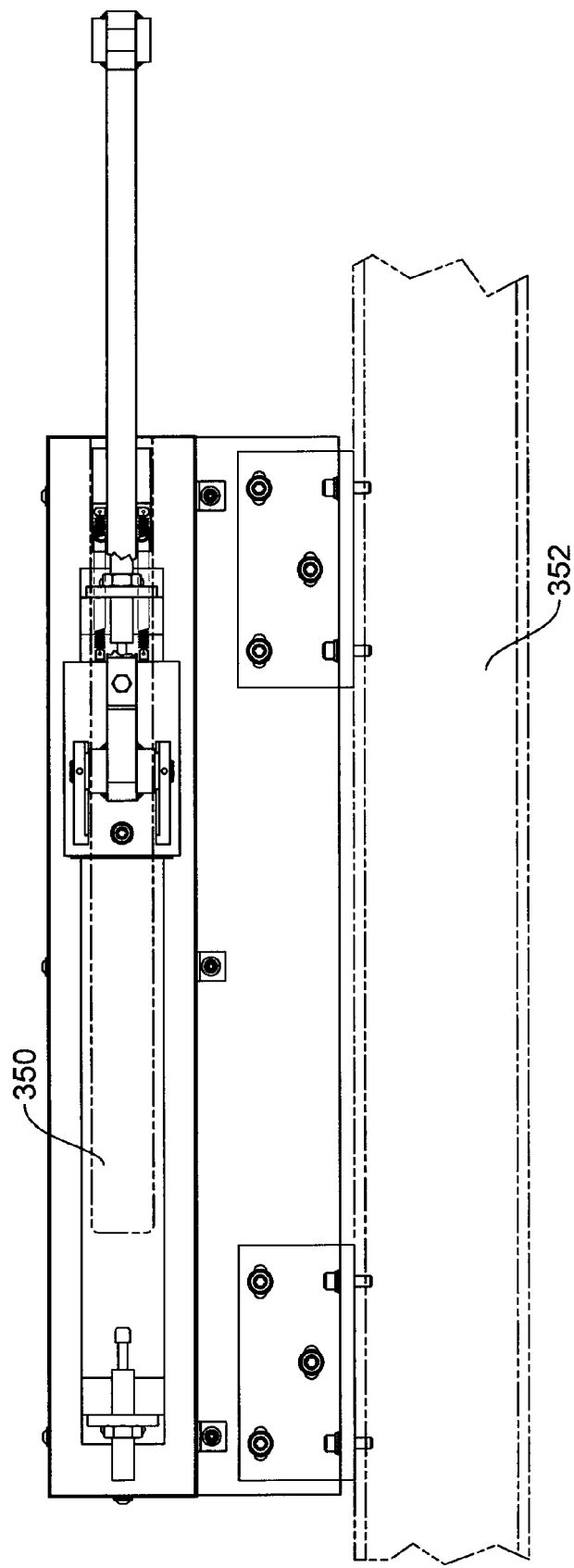
Figure 4I:
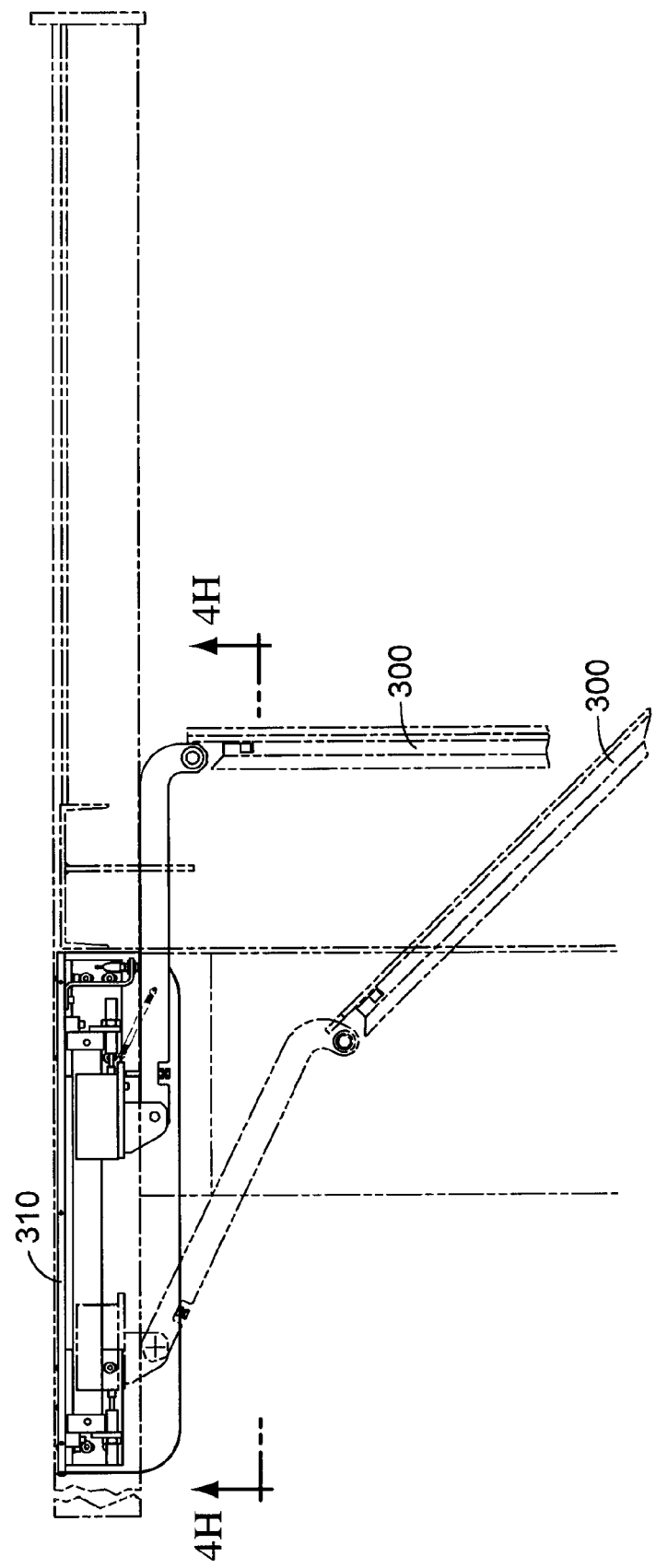
Figure 4J:
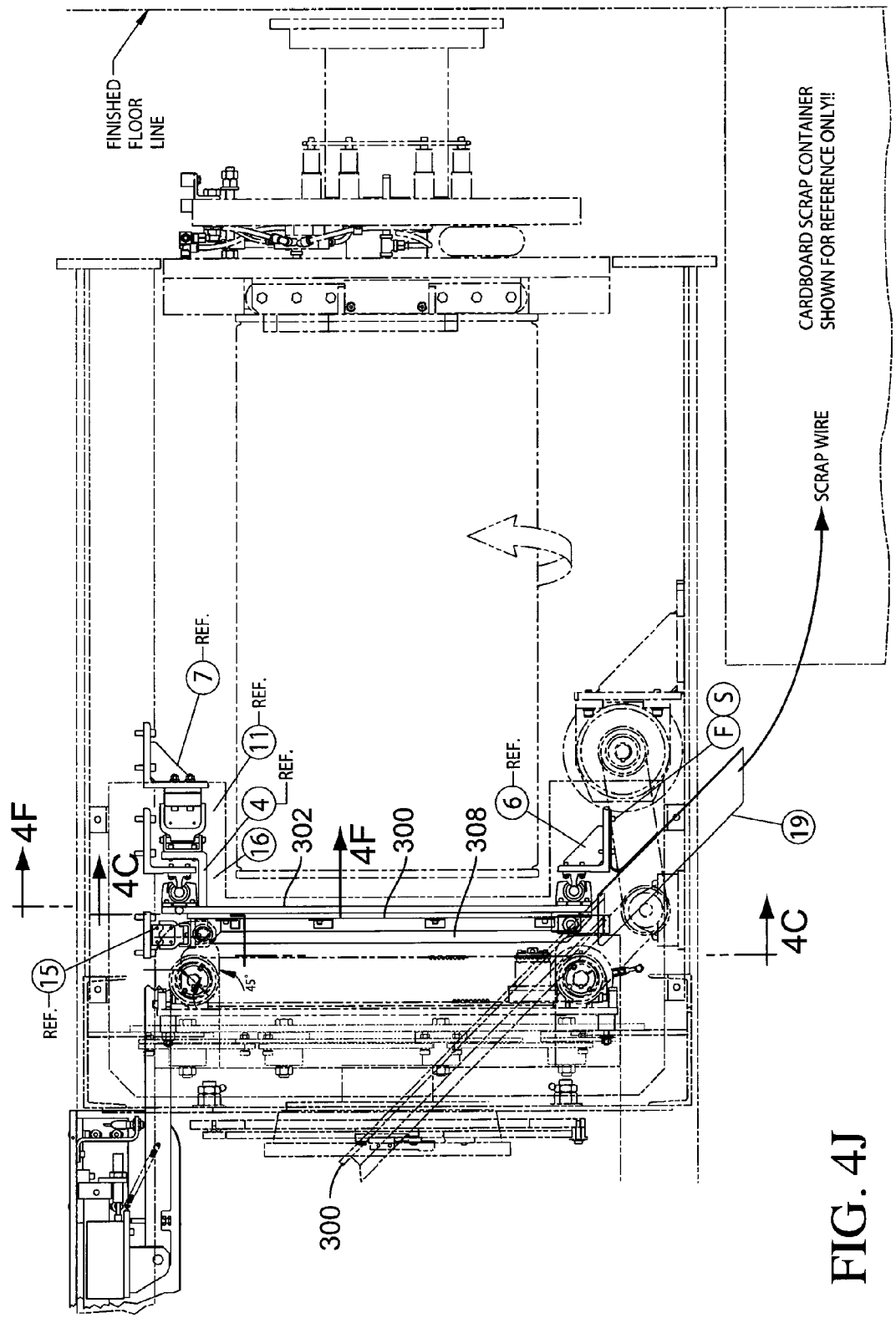
Figure 5A:
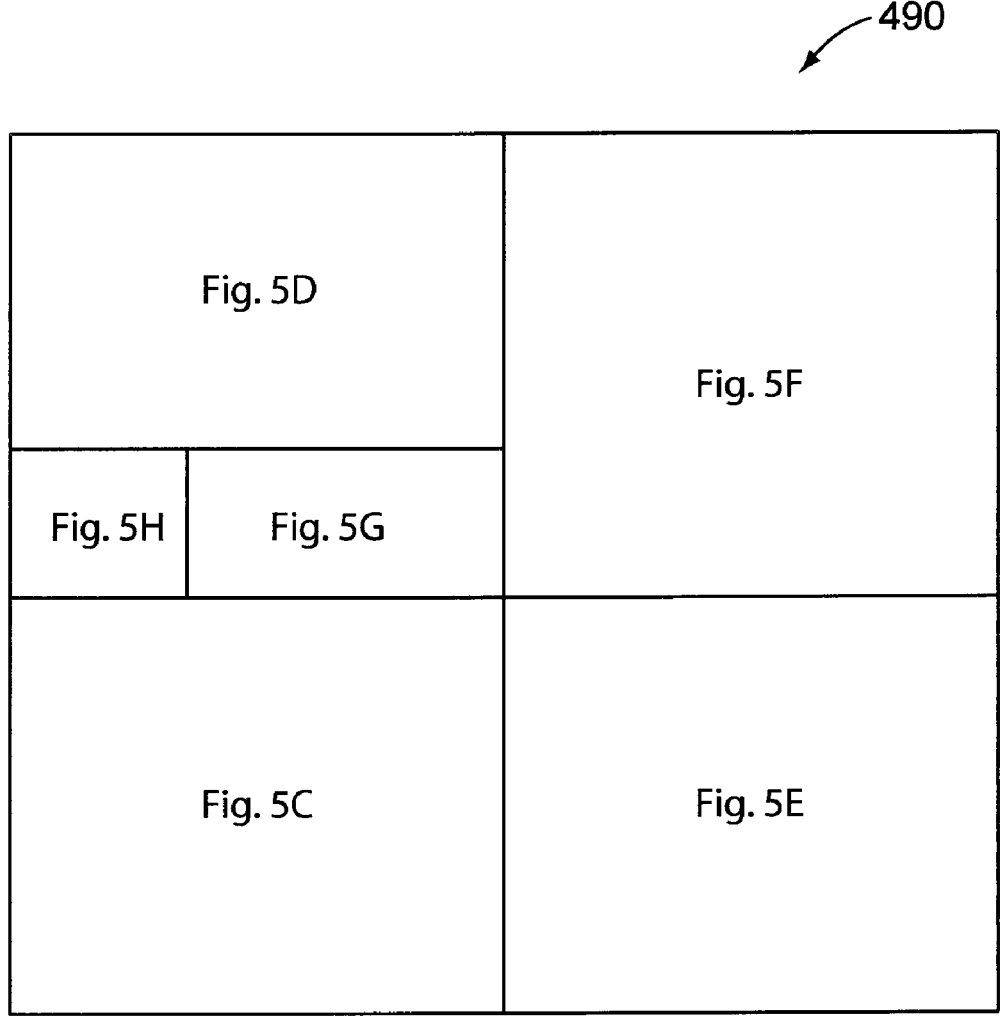
Figure 5C:
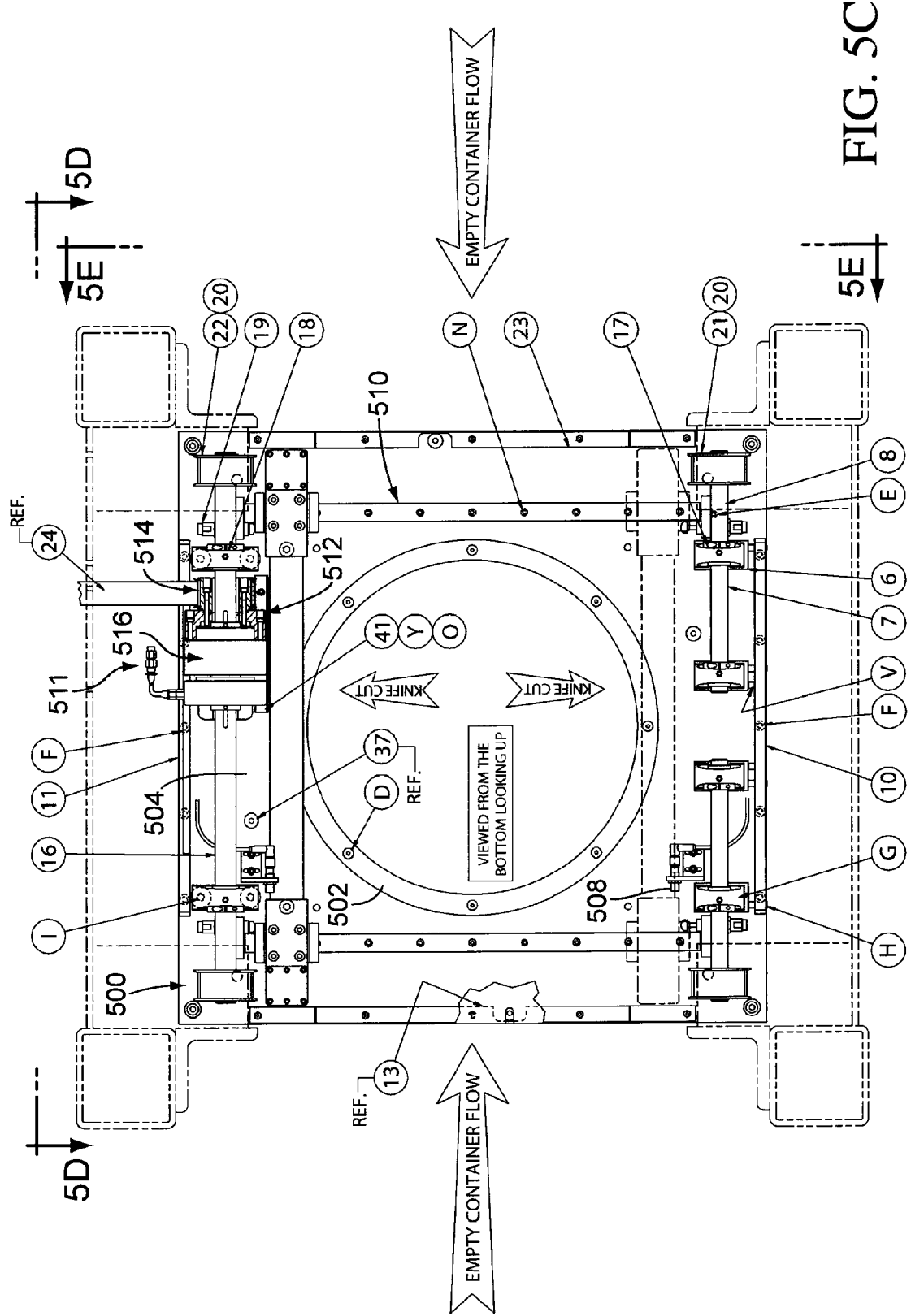
Figure 5D:
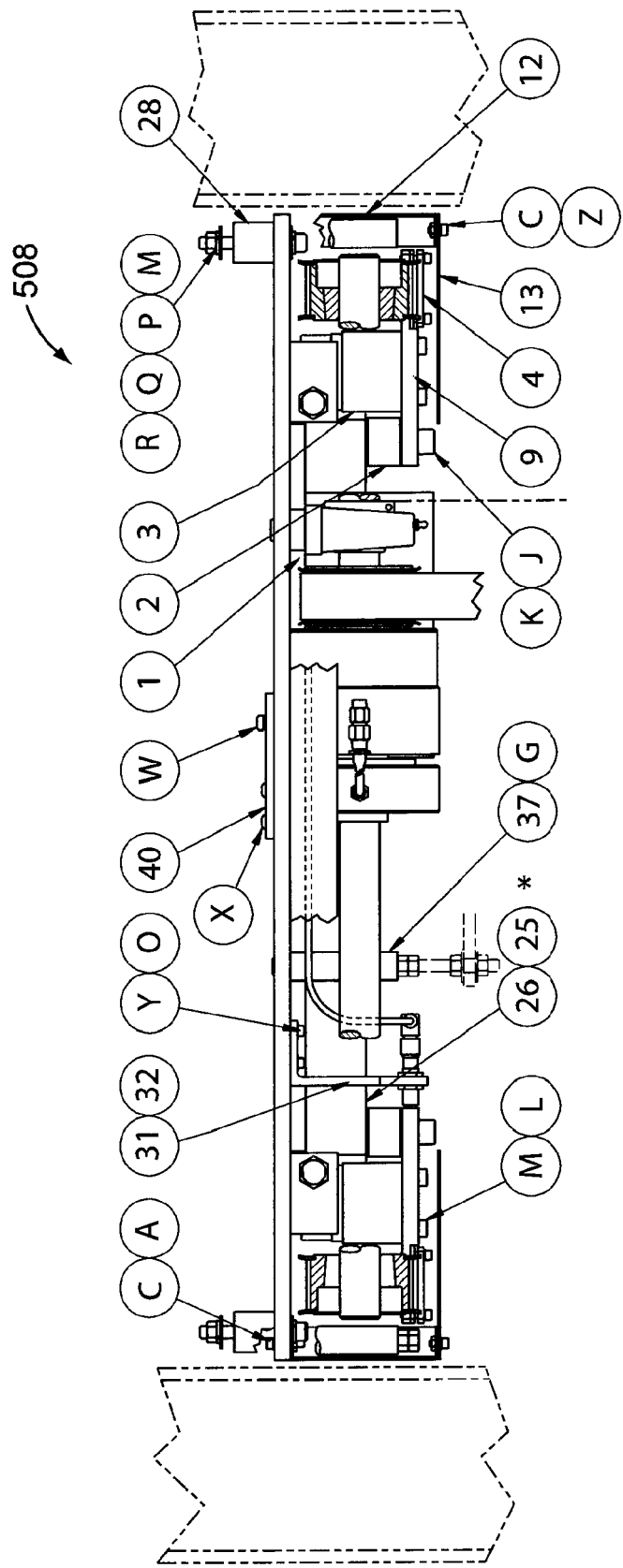
Figure 5E:
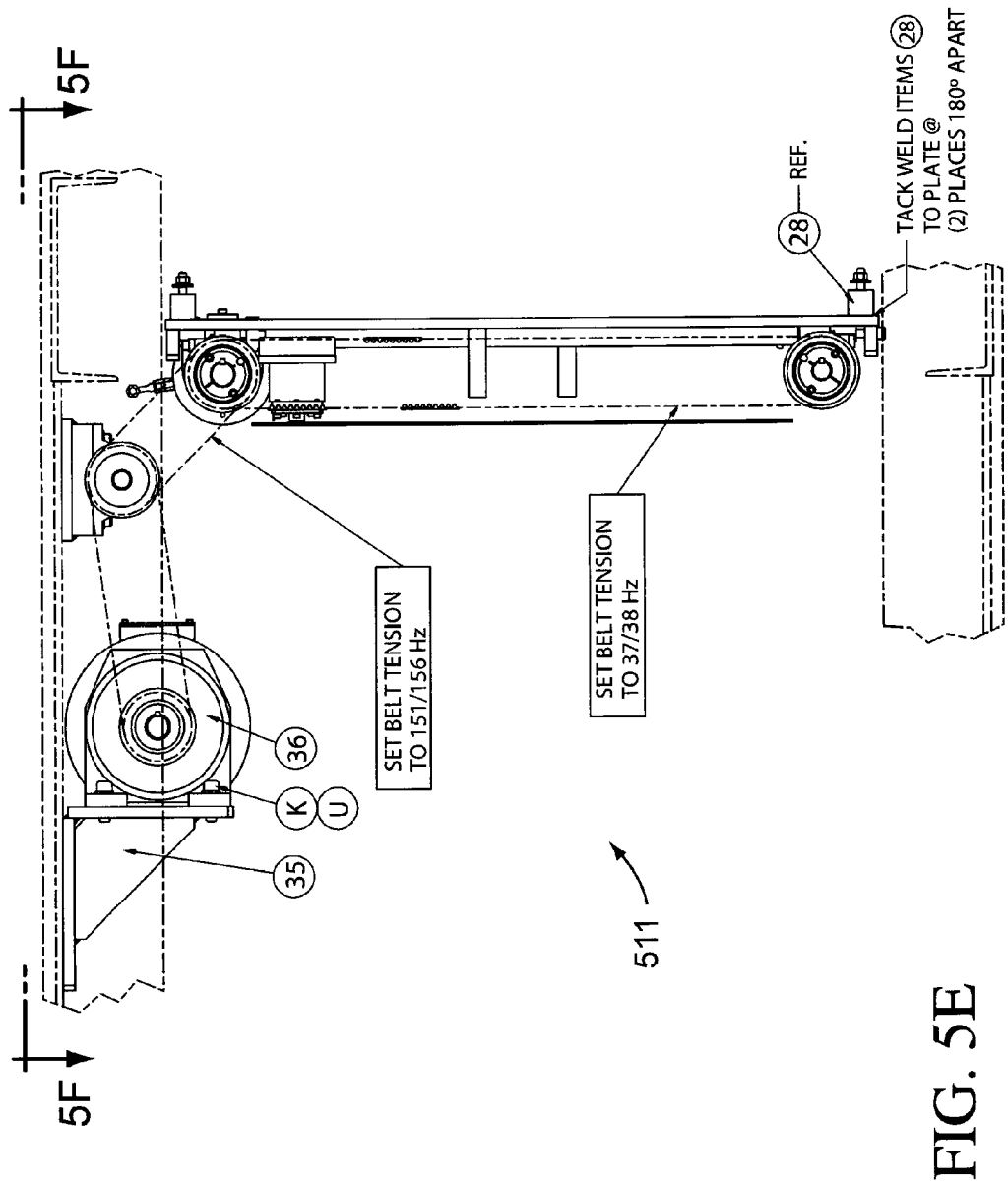
Figure 5F:
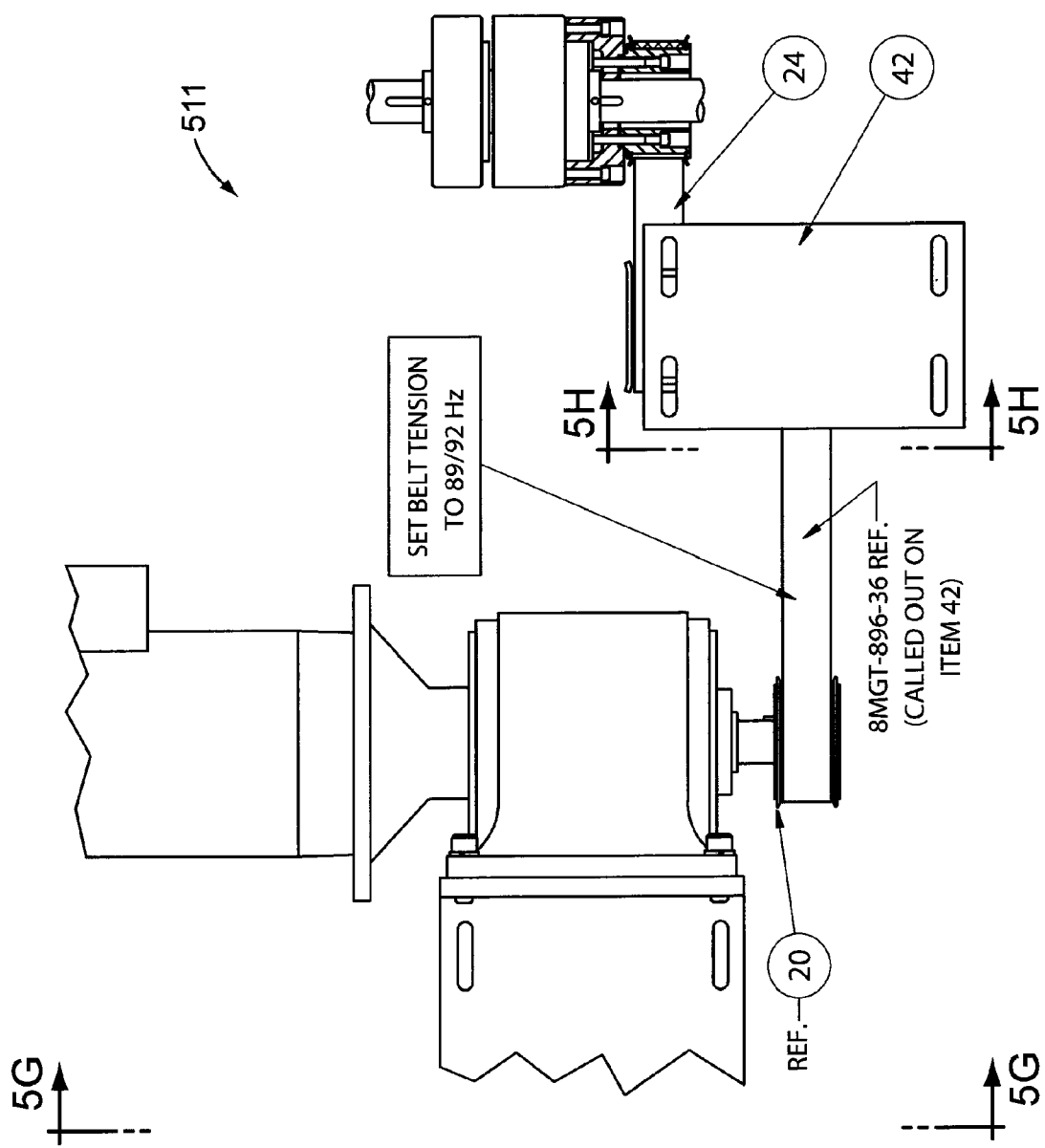
Figure 5G:
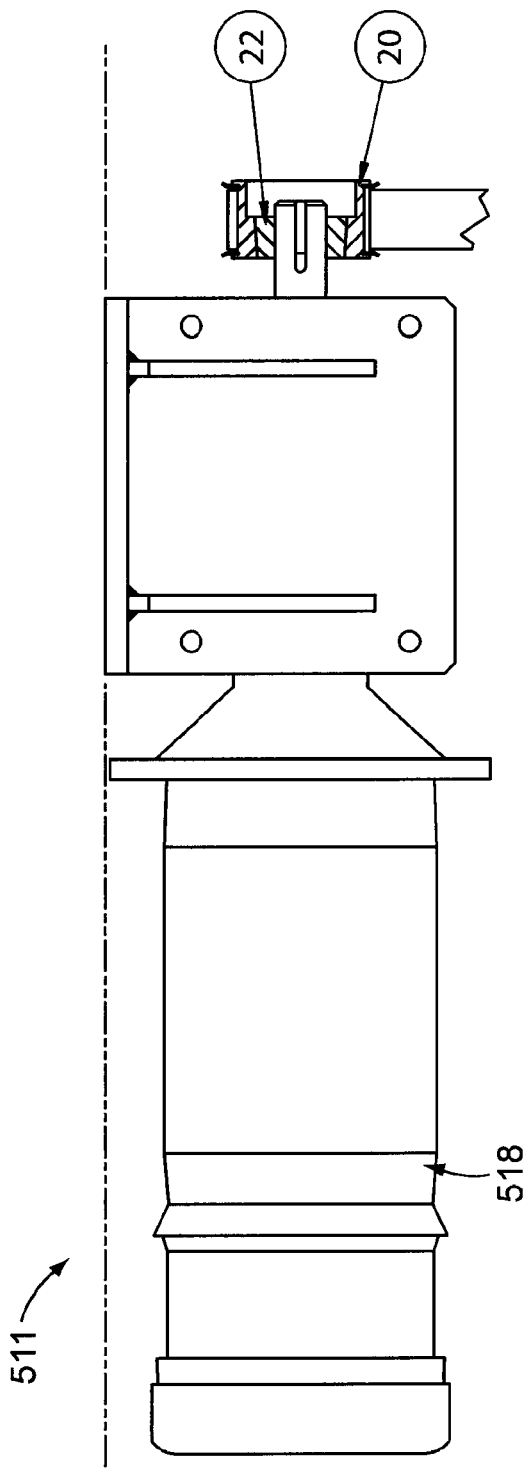
Figure 5H:
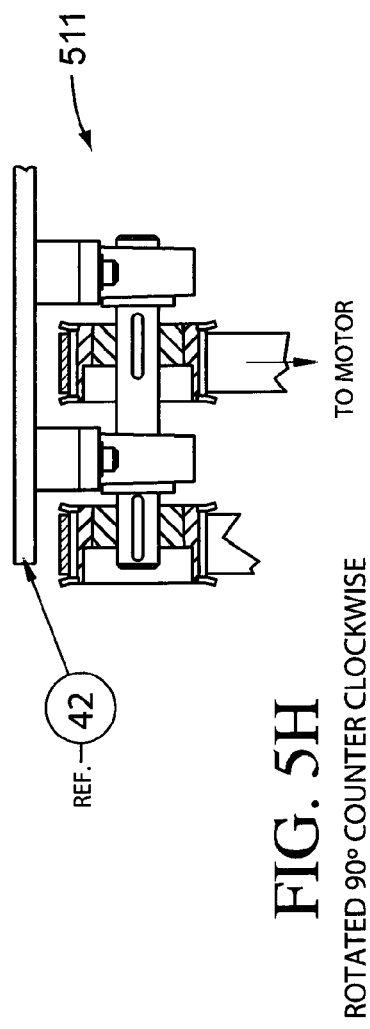

FIG. 4D shows a front view of the scrap tray 138, in both positions, with the reciprocating plate 302, tilting plate 300 and scrap catcher 308. The plate stop 320 with the shock absorber acts to mechanically stop the scrap tray 138 when it reaches the active scrap removal position, (see also FIG. 4E). In the active scrap removal position, as shown in FIG. 4E, the reciprocating plate 302 engages the wire between it and the squeezer plate 330. The wire is squeezed between the two plates 302 and 330. FIGS. 4F-4H show the various brackets 350 and support structures 352 for the reciprocating plate 302. FIGS. 4I and 4J show the lift linkage 310 and scrap wire discarding mechanism in operation.

In order to isolate the defective wire segment the knife assembly is built to perform two cuts as described above. The next set of diagrams, FIGS. 5A-5H, show the wire cutter assembly for use with the spark fault scrap removal system. Again, this set includes an overall diagram 490 in FIG. 5A and a parts list table 492 in FIG. 5B. More specific diagrams for the various components start with FIG. 5C which shows the knife assembly from the bottom looking up. The main plate 500 is the structure supporting the knife assembly. The knife ring 502 defines the circular space in the main plate 500 through which the wire passes as it hangs down from the accumulator 134 (FIG. 2). The knife block 504 is reciprocating and shown as being movable both ways, as represented in the diagram by the arrows (in one side, the knife block is shown in dotted line). As the reciprocating knife block completes a stroke in either direction, its proximity is sensed by a proximity switch 508 located at each of the sides. The knife block 504 travels along a linear motion system 510 supported at each end by that motion system. The knife block is driven by a drive assembly 511 that includes a motor-belt configuration 512, 514, 516 and the torque is transferred to the knife block 504 via a shaft 520. Finally, FIGS. 5D-5H provide a closer and more detailed view of the drive assembly 511, proximity switch connections for connecting to the proximity switch 508, and other support and fastening structures.

The foregoing description in conjunction with the aforementioned three sets of drawings applies to a particular implementations of the scrap wire removal module. However, although the various aspects of the present invention have been shown and described in considerable detail with reference to particular implementations thereof, other implementations are possible. Therefore, the spirit and scope of the present invention should not be limited to the illustration and description of the preferred versions contained herein.

What is claimed is:

1. An apparatus for automatically separating and removing a scrap wire segment containing a spark fault defect from a wire insulation line being processed, the apparatus comprising:

a knife assembly, comprising a reciprocating, bi-directional knife, constructed to cut in both directions to separate the scrap wire segment containing the spark fault defect from the wire insulation line being processed by two passes of the knife, a first stroke in a forward direction from an original position, and a second stroke in a reverse direction, returning the knife to the original position, thus the assembly is constructed to cut the scrap wire segment by the first stroke upstream from the wire insulation line that has passed below the knife assembly and creating a first leading end of the scrap wire segment, and then to separate the scrap wire segment from the wire insulation line upstream from the defect by the second stroke at the second, opposing end of the scrap wire segment;

a scrap tray below the knife assembly, for catching the separated scrap wire segment, said scrap tray having at least two plates, wherein one plate is a tilting plate and the other plate is a reciprocating plate;

an accumulator with curved hooks for catching and accumulating the scrap wire segment after the first cut by the knife assembly, until the scrap wire segment is cut from the upstream wire insulation line, wherein the curved hooks are rotatable in one direction for catching and accumulating the scrap wire segment, and in the opposite direction for letting the scrap wire segment drop after separation at both ends from the wire insulation line; and a lift linkage operatively engaged with the tilting plate, the lift linkage being extendable when activated to tilt the tilting plate at an angle sufficient to permit the separated scrap wire segment to slide from the tilting plate for removal.

2. The apparatus of claim 1, further comprising a rail assembly, wherein the scrap tray is reciprocable on the rail assembly between two positions, active and resting.

3. The apparatus of claim 1, wherein the tilting plate is constructed to permit the separated scrap wire segment to slide from the tilting plate to a container.

4. The apparatus of claim 1, further comprising a proximity switch at each of two sides of the knife assembly, said switch positioned to operatively detect proximity of the bi-directional knife upon completing each knife stroke.

5. The apparatus of claim 2, wherein the scrap tray is configured for a reciprocating motion between active and resting positions, the scrap tray further having a pin extending therefrom to operatively engage the lift linkage as the scrap tray returns from the active to the resting position.

6. The apparatus of claim 2, wherein the scrap tray is automatically movable from a resting position to an active position in response to detection of a spark fault defect in the wire insulation line, whereby the scrap tray is signaled to remove separated, defective scrap wire segments.

7. The apparatus of claim 1, wherein the reciprocal plate is operably configured with a further squeezer plate to snag and squeeze the scrap wire segment between the reciprocal plate and the squeezer plate for removal from the insulated wire.

8. The apparatus of claim 1, wherein the accumulator has a top surface and a bottom surface, between which surfaces, the accumulator comprises a passageway having an opening on the top surface and a corresponding opening on the bottom surface of the accumulator for transporting the scrap wire segment therebetween.

9. The apparatus of claim 8, wherein the curved hooks are distributed along a perimeter proximate to the opening in the top surface of the accumulator, and said hooks are rotatable between closed and open positions, so that in the closed position the hooks are oriented to catch and collect the scrap wire to prevent the scrap wire segment from falling through the passageway.

10. The apparatus of claim 1, wherein the scrap tray further comprises a scrap wire catcher to hold a separated scrap wire segment in place while the scrap tray transports the separated scrap wire segment for disposal.

* * * * *